(12) United States Patent
Jeon et al.

(10) Patent No.: US 11,588,599 B2
(45) Date of Patent: Feb. 21, 2023

(54) ENHANCEMENTS ON RANDOM ACCESS FOR NR-UNLICENSED

(71) Applicant: Apple Inc., Cupertino, CA (US)

(72) Inventors: Jeongho Jeon, San Jose, CA (US); Seau Lim, Swindon (GB); Yongjun Kwak, Portland, OR (US); Anthony Lee, San Diego, CA (US); Hwan-Joon Kwon, Portland, OR (US); Joonyoung Cho, Portland, OR (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 17/241,586

(22) Filed: Apr. 27, 2021

(65) Prior Publication Data

US 2021/0251042 A1 Aug. 12, 2021

Related U.S. Application Data

(63) Continuation of application No. 16/369,187, filed on Mar. 29, 2019, now Pat. No. 10,993,283.

(60) Provisional application No. 62/670,222, filed on May 11, 2018, provisional application No. 62/653,673, filed on Apr. 6, 2018.

(51) Int. Cl.
| | |
|---|---|
| *H04W 16/14* | (2009.01) |
| *H04W 72/14* | (2009.01) |
| *H04W 74/08* | (2009.01) |
| *H04W 88/02* | (2009.01) |
| *H04W 88/04* | (2009.01) |
| *H04W 88/06* | (2009.01) |

(Continued)

(52) U.S. Cl.
CPC .............. *H04L 5/0048* (2013.01); *H04L 5/00* (2013.01); *H04W 16/14* (2013.01); *H04W 72/14* (2013.01); *H04W 74/002* (2013.01); *H04W 74/0808* (2013.01); *H04W 74/0833* (2013.01); *H04W 88/023* (2013.01); *H04W 88/04* (2013.01); *H04W 88/06* (2013.01)

(58) Field of Classification Search
CPC . H04W 16/14; H04W 72/14; H04W 74/0808; H04W 74/0833; H04W 88/023; H04W 88/04; H04W 88/06
See application file for complete search history.

(56) References Cited

U.S. PATENT DOCUMENTS

| | | |
|---|---|---|
| 2017/0231011 A1 | 8/2017 | Park |
| 2017/0289967 A1* | 10/2017 | Yu .......................... H04L 5/0037 |
| 2019/0132882 A1* | 5/2019 | Li ...................... H04W 74/0816 |

OTHER PUBLICATIONS

Non-Final Office Action dated Sep. 9, 2020 in connection with U.S. Appl. No. 16/369,187.

(Continued)

*Primary Examiner* — Ayanah S George
(74) *Attorney, Agent, or Firm* — Eschweiler & Potashnik, LLC

(57) ABSTRACT

A network device (e.g., a user equipment (UE), or a new radio NB (gNB)) can process or generate a configuration of a physical random access channel (PRACH) over physical resource blocks (PRBs) that are interlaced in an unlicensed band in an NR unlicensed (NR-U) communication. The PRBs in the PRACH can be based on an occupied channel bandwidth (OCB) of the unlicensed band in the NR-U communication. A random access channel transmission in the PRACH can then be generated by interlacing the PRBs defining the PRACH.

20 Claims, 15 Drawing Sheets

(51) Int. Cl.
*H04L 5/00* (2006.01)
*H04W 74/00* (2009.01)

(56) References Cited

OTHER PUBLICATIONS

Notice of Allowance dated Dec. 28, 2020 in connection with U.S. Appl. No. 16/369,187.

* cited by examiner

| SCS (kHz) | 5MHz $N_{RB}$ | 10MHz $N_{RB}$ | 15MHz $N_{RB}$ | 20 MHz $N_{RB}$ | 25 MHz $N_{RB}$ | 30 MHz $N_{RB}$ | 40 MHz $N_{RB}$ | 50MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

| SCS (kHz) | 50MHz $N_{RB}$ | 100MHz $N_{RB}$ | 200MHz $N_{RB}$ | 400 MHz $N_{RB}$ |
|---|---|---|---|---|
| 60 | 66 | 132 | 264 | N.A |
| 120 | 32 | 66 | 132 | 264 |

ENHANCEMENTS ON RANDOM ACCESS FOR NR-UNLICENSED

REFERENCE TO RELATED APPLICATIONS

This application is a continuation of U.S. application Ser. No. 16/369,187, patented on Apr. 27, 2021 as U.S. Pat. No. 10,993,283, which claims the benefit of U.S. Provisional Application No. 62/653,673 filed Apr. 6, 2018, entitled "ENHANCEMENTS ON RANDOM ACCESS FOR NR-UNLICENSED", and the benefit of U.S. Provisional Application No. 62/670,222 filed May 11, 2018, entitled "MULTIPLE PRACH RESOURCE CONFIGURATION IN A WIDEBAND CARRIER FOR NR-UNLICENSED", the contents of which are herein incorporated by reference in their entirety.

FIELD

The present disclosure relates to wireless technology, and more specifically to random access channel (RACH) design for new radio (NR) systems or network devices of an NR network that are unlicensed.

BACKGROUND

The random access (RA) process in wireless systems is normally used to extract timing and frequency (phase) information of the uplink (UL) transmission for UL timing synchronization and initial frequency correction, and to initiate the network entry process for the mobile device (e.g., user equipment (UE)). In 3GPP Rel-15, study on NR-based access to unlicensed spectrum has initiated. Rel-15 NR system is designed to be operable on licensed spectrum. The NR-unlicensed, a shorthand notation of the NR-based access to unlicensed spectrum, is a technology to enable the operation of NR system using unlicensed spectrum. The technologies for NR-unlicensed can be categorized into those to support carrier aggregation (CA), dual connectivity (DC), and standalone modes of network operation. The enhancement of random access is essential to enable NR-unlicensed operation.

BRIEF DESCRIPTION OF THE DRAWINGS

FIG. 9 is a diagram of an example table that provides the supported channel bandwidth (CBW) at a given subcarrier spacing.

FIG. 10 is a diagram of another example table that provides the supported channel bandwidth (CBW) at a given subcarrier spacing.

DETAILED DESCRIPTION

Figure 1:
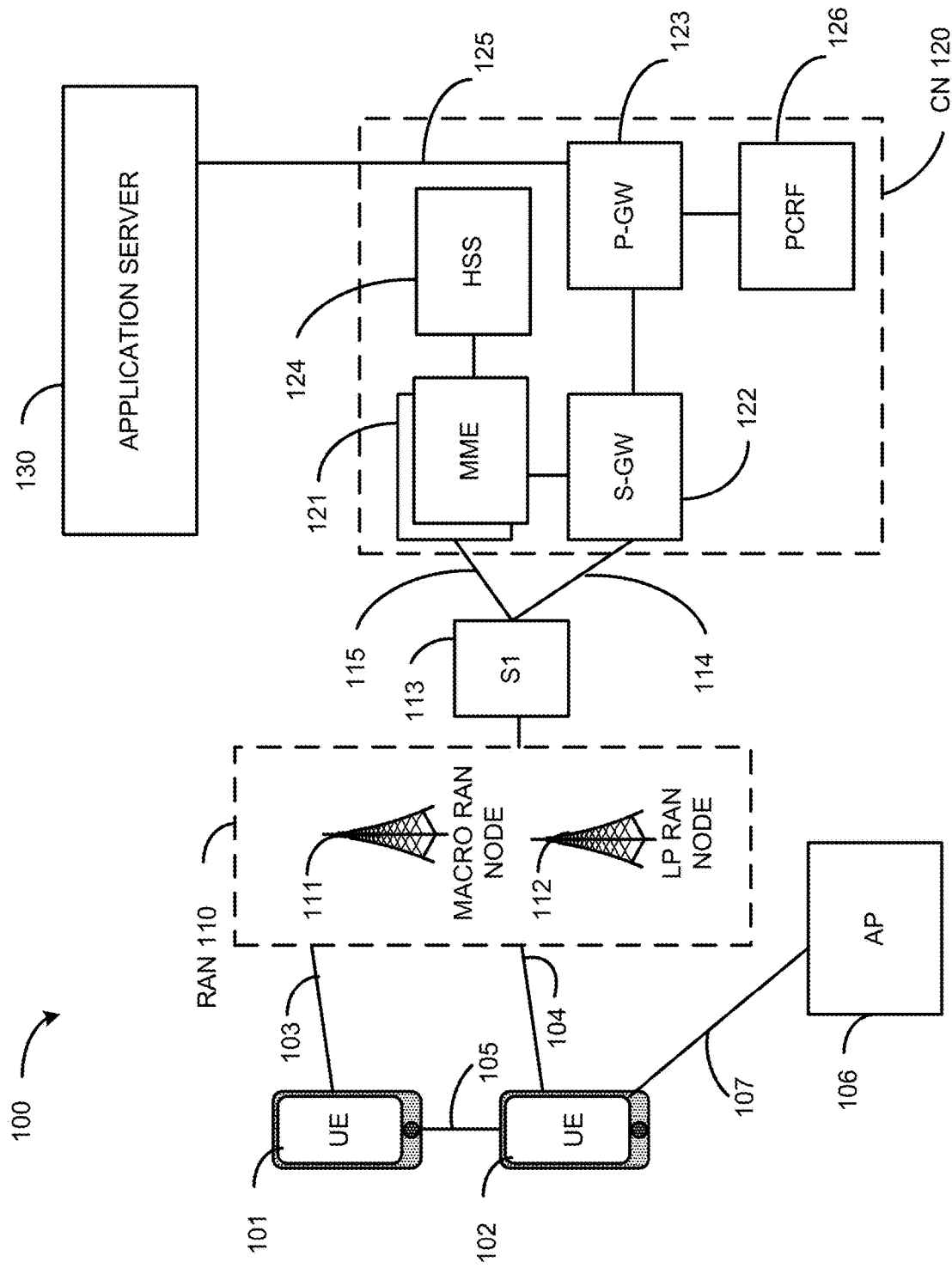
FIG. 1 is a block diagram illustrating an example of user equipment(s) (UEs) in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, the present disclosure provides various embodiments/aspects for generating physical random access channel (PRACH) transmissions such as a random access preamble transmission or the like by defining PRACH over interlaced PRBs in an unlicensed spectrum, rather than contiguous PRBs. In unlicensed spectrum, especially in 5 GHz band, there is occupied channel bandwidth (OCB) regulation in EU. With the OCB regulation, a transmission occupies more than 80% of declared nominal channel bandwidth. The interlaced PRBs for PRACH can satisfy the OCB regulation. In unlicensed spectrum, there is power spectrum density (PSD) limit, which is usually defined per 1 MHz unit bandwidth in a sliding window fashion. Thus, when transmission occurs over contiguous PRBs, the total transmission power is limited by PSD than by the limit on total transmission power. When interlaced PRBs are used, it can be possible to allocate the amount of power allowed for unit 1 MHz bandwidth on a single PRB, if adjacent PRBs in the same interlace are 1 MHz apart from each other.

In an embodiment, the interlaced PRBs for PRACH can be configured to be equally spaced. This can be to maximally utilize the transmission power allowed in unit bandwidth and also to make the interlace design uniform and simple.

Alternatively, or additionally, the PRBs for PRACH can be configured to be irregularly spaced. For example, two interlaces can be allocated, each having equi-distance between PRBs, and X number of PRBs can be randomly selected from the two interlaces, wherein X comprises an integer of one or more.

In an aspect, the distance between adjacent PRBs in the interlaced PRBs for PRACH can be at least 1 MHz apart from each other. This can function to maximally utilize the transmission power allowed in unit bandwidth.

In various embodiments described herein, multiple PRACH resource configuration(s) in frequency domain (or in frequency and time domain) can be further configured for a given NR wideband carrier to improve the reliability of preamble transmission subject to Listen-Before-Talk (LBT) operations. As referred to herein, a category 4 LBT protocol/procedure can be longer than a single interval LBT or just a clear channel assessment and further include a backoff operation or procedure. For example, the category 4 LBT protocol can further include a random backoff procedure (e.g., an exponential random backoff procedure) as opposed to a clear channel assessment alone that can comprise a single interval LBT (or short Cat 4 LBT) operation; whereby a puncturing of the first symbol of a transmission occurs as part of the channel assessment to determine a busy channel or an idle/available channel/band. Additional aspects and details of the disclosure further described below with reference to figures.

Embodiments described herein can be implemented into a system or network device using any suitably configured hardware and/or software. FIG. 1 illustrates an architecture of a system 100 of a network in accordance with some embodiments. The system 100 is illustrated to include a UE 101 and a UE 102, which can further represent new radio (NR) devices as discussed herein.

FIG. 1 illustrates an architecture of a system 100 of a network in accordance with some embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDCCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 120 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
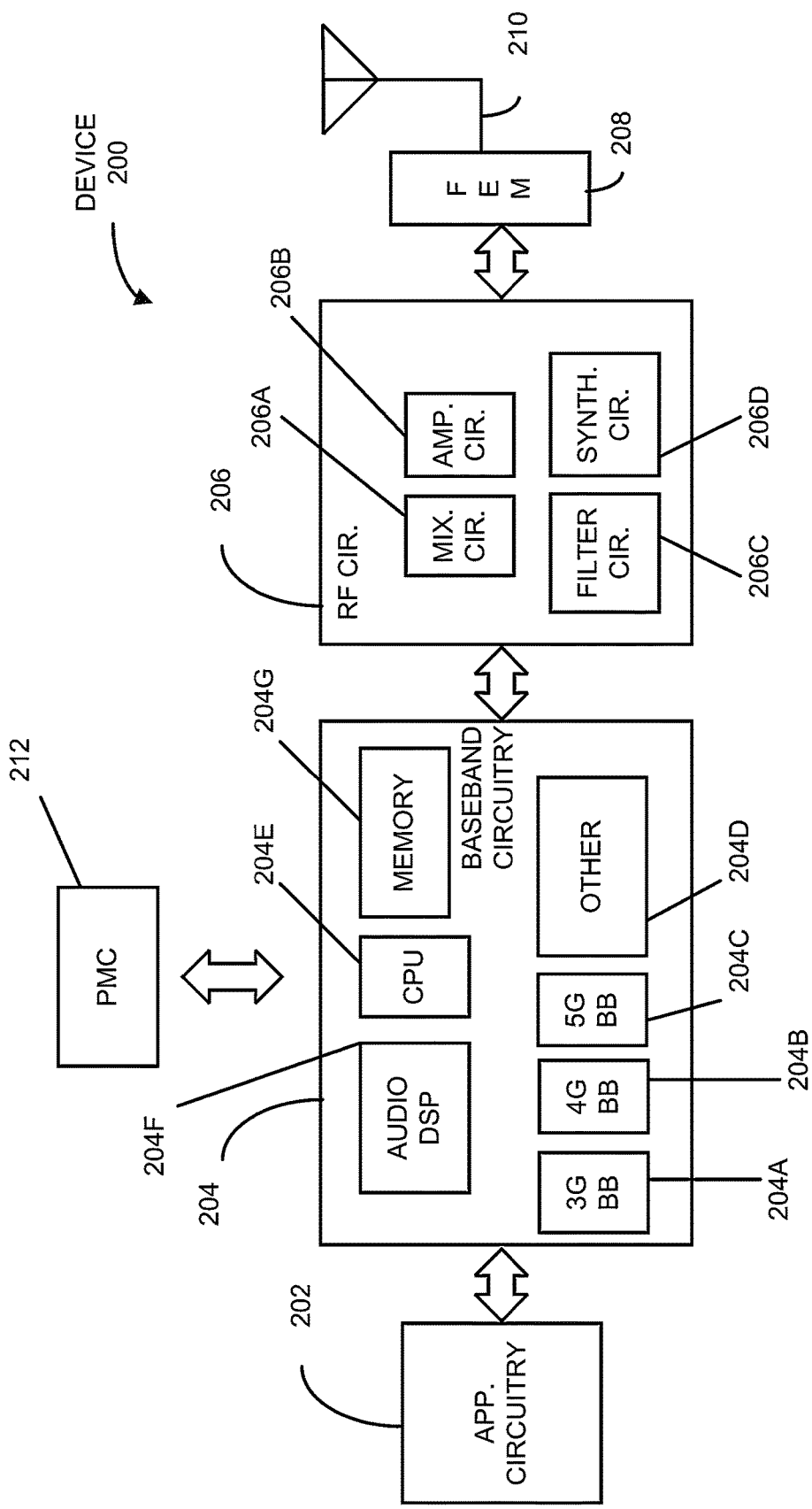
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

Figure 4:
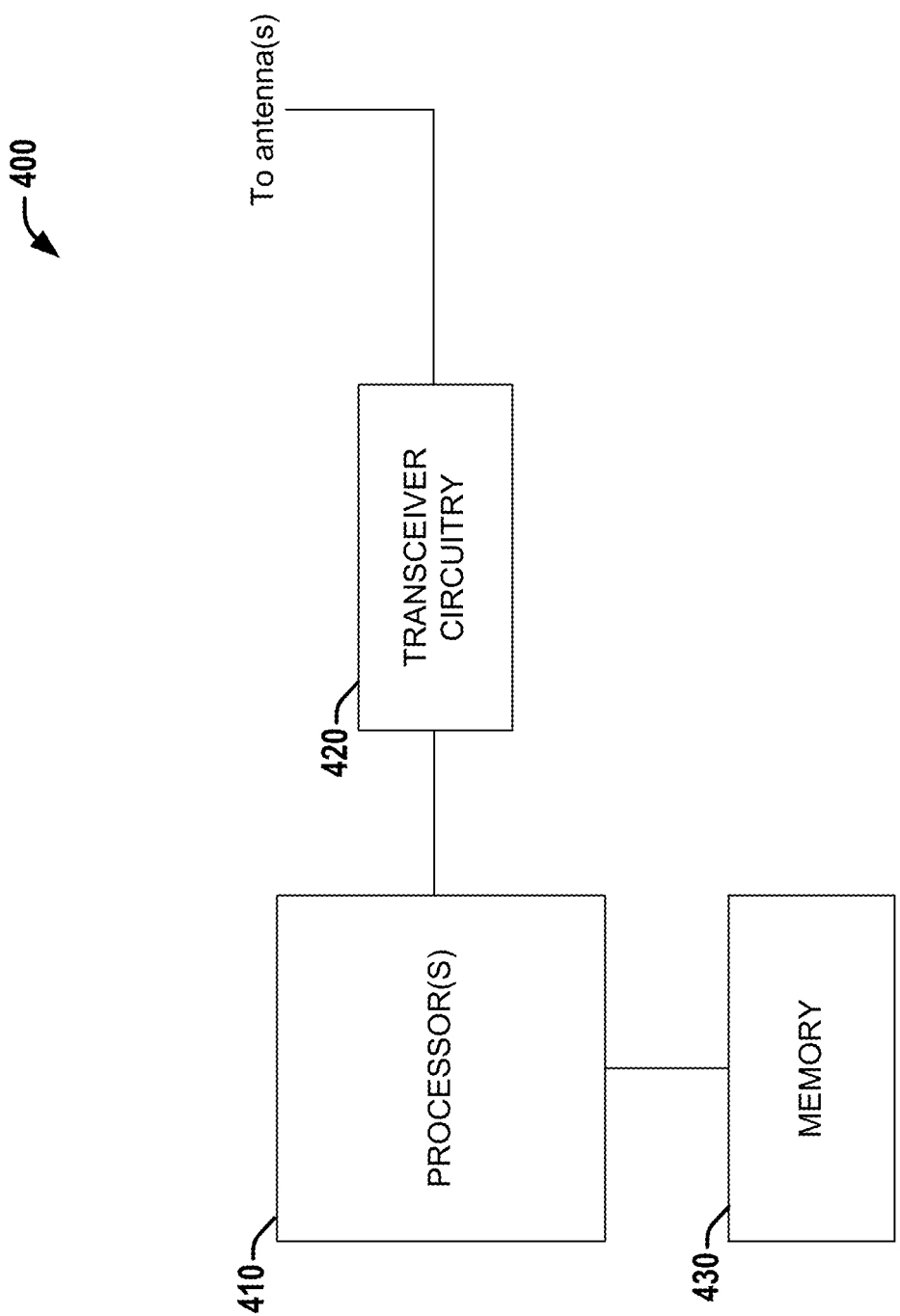
FIG. 4 is a block diagram illustrating a system employable at a UE, according to various aspects described herein.
Figure 5:
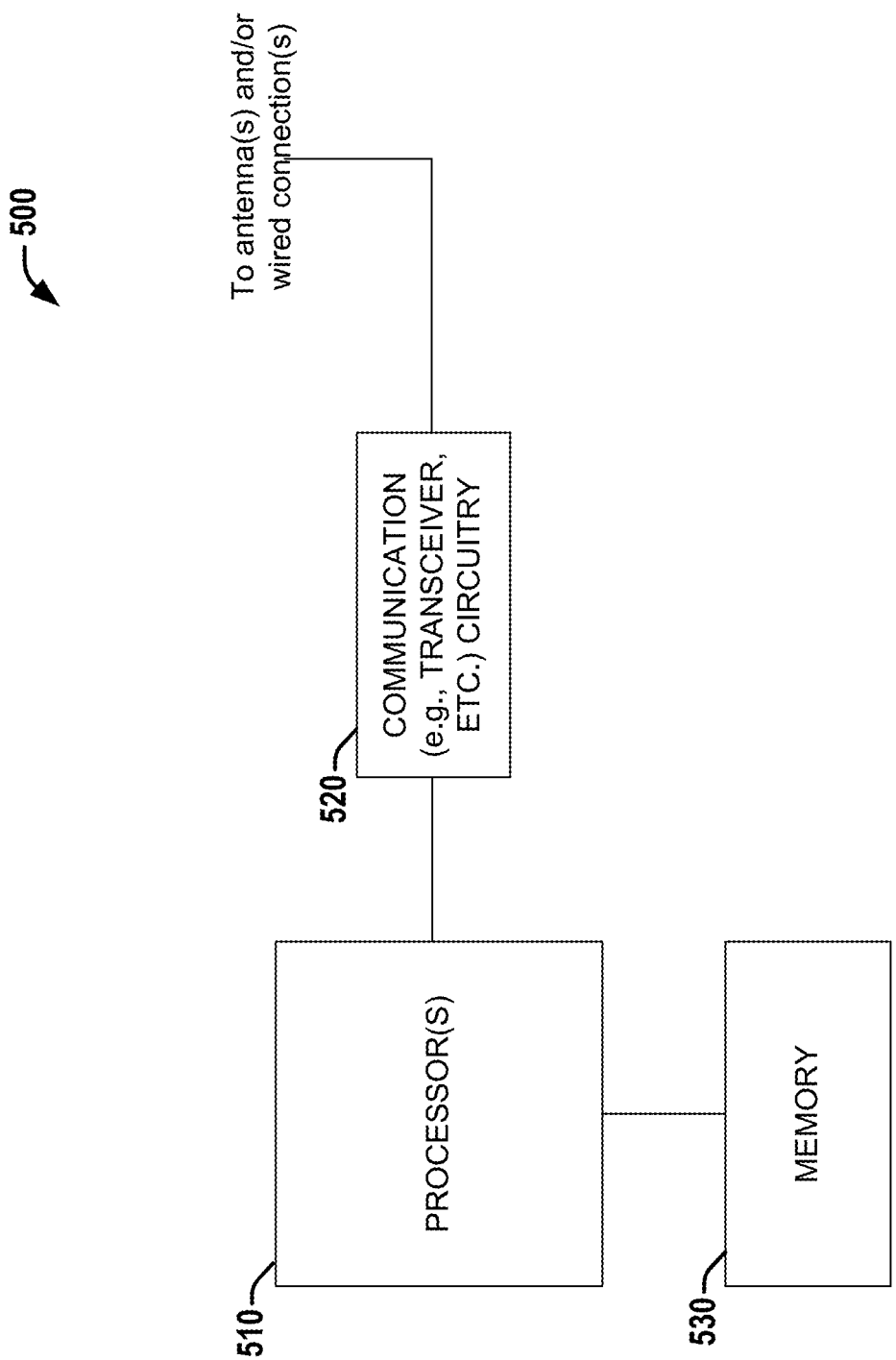
FIG. 5 is a block diagram illustrating a system employable at a BS (Base Station according to various aspects described herein.

In addition, the memory 204G (as well as other memory components discussed herein, e.g., memory 430 of FIG. 4, memory 530 of FIG. 5 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU- TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage-controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 2 12 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
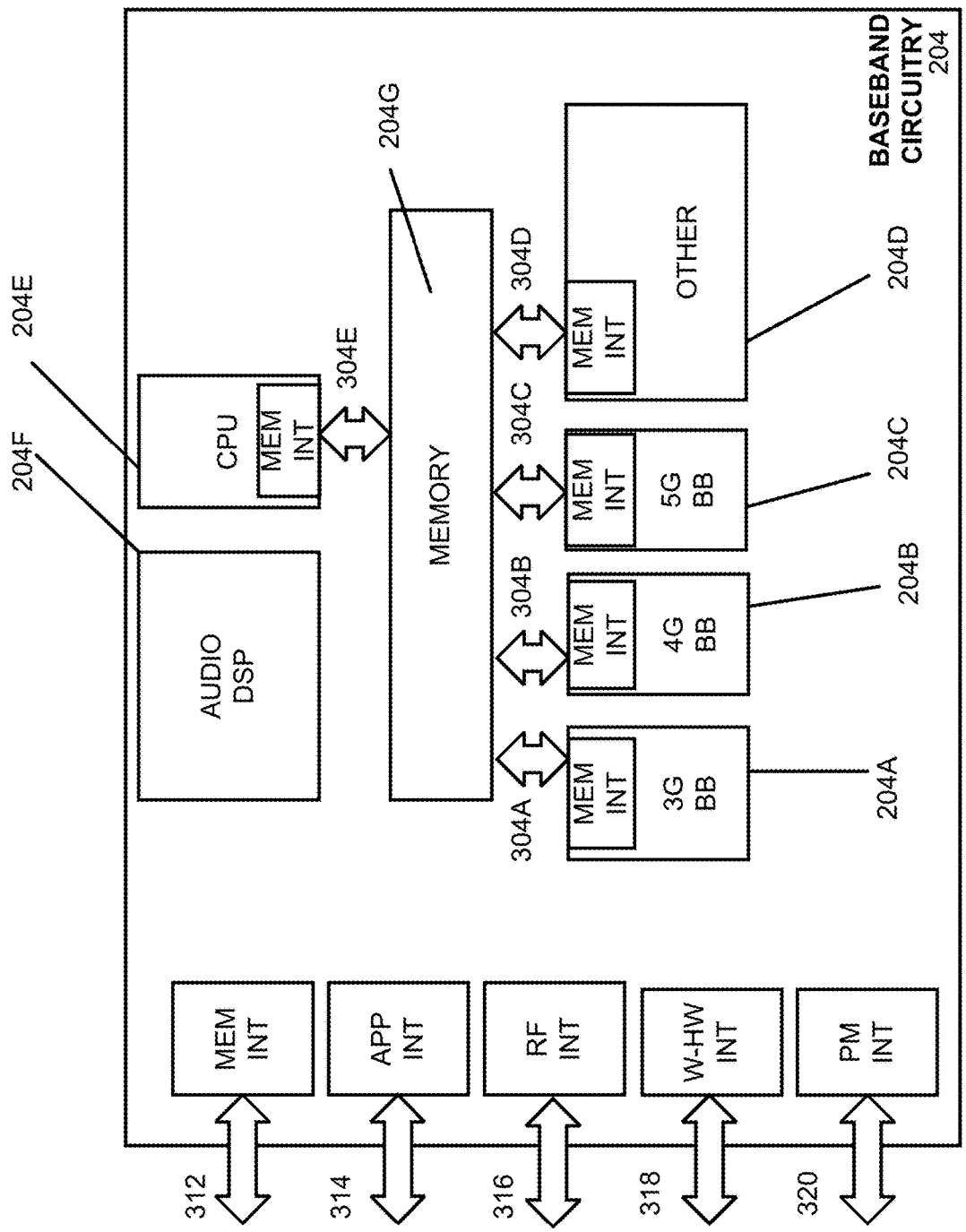
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Referring to FIG. 4, illustrated is a block diagram of a system/device 400 employable at a UE or other network device (e.g., UE 101/102) that facilitates DCI configurations to reduce the decoding complexity and signaling overhead for 5G NR devices as UE 101/102, for example. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420).

Referring to FIG. 5, illustrated is a block diagram of a system 500 employable at a Base Station (BS), eNB, gNB or other network device (e.g., aV2X node as eNB/gNB 111/112) that can enable generation and processing of configurable search spaces and related resources (e.g., times, time instances, CCEs, aggregation levels, or the like) for one or more UEs (e.g., URLLC UEs, or non-URLLC UEs) according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture.

Figure 6:
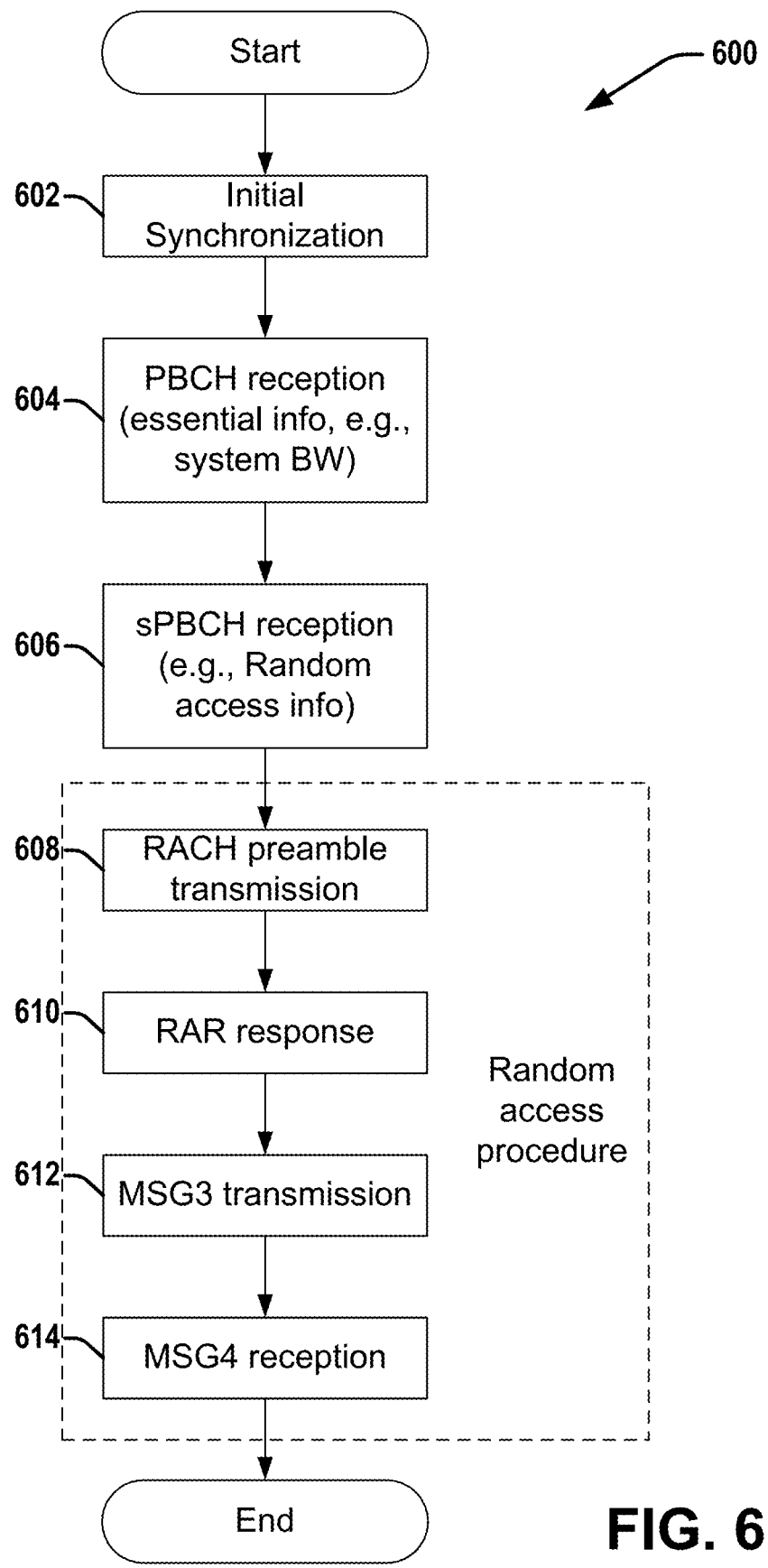
FIG. 6 is a diagram illustrating an initial access procedure, in connection with various aspects discussed herein.

Referring briefly to FIG. 6 in conjunction with other Figures, illustrated is a diagram showing an initial access procedure 600, in connection with various aspects discussed herein. When a UE starts the initial access, it can first perform initial synchronization by detecting (e.g., via processor(s) 410 and transceiver circuitry 420) synchronization signals (at 602) and can receive (e.g., via transceiver circuitry 420) PBCH (Physical Broadcast Channel) (at 604) to obtain the most essential system information, and can receive PBCH (at 606) to obtain (e.g., via transceiver circuitry 420) at least random access procedure configuration information or PRACH resources via another physical channel. For the random access procedure, the UE can transmit (e.g., via transceiver circuitry 420) the PRACH preamble (Msg1 (Message 1)) (e.g., generated by processor(s) 410) using the configured resources (at 608). At 610, a random access response (Msg2) can be transmitted (e.g., via communication circuitry 520) from the BS (e.g., gNB) when it detects (e.g., via communication circuitry 520 and processor(s) 510) the preamble (e.g., generated by processor(s) 410, transmitted via transceiver circuitry 420, received via communication circuitry 520, and processed by processor(s) 510). At 612, the UE can transmit Msg3 (e.g., wherein Msg3 can be generated by processor(s) 410, transmitted via transceiver circuitry 420 (e.g., over NR (New Radio) PUSCH (Physical Uplink Shared Channel)), received via communication circuitry 520, and processed by processor(s) 510), which can comprise ID (Identification) information and other UE status information for contention resolution. At 614, the BS (e.g., gNB) can transmit Msg4 (e.g., generated by processor(s) 510, transmitted via communication circuitry 520, received via transceiver circuitry 420, and processed by processor(s) 410) for collision/contention resolution, after which the initial access procedure finishes.

In an embodiment, processors 410/510 of the UE 400/ gNB 500 can be configured to generate a random access channel transmission (e.g., a preamble transmission, random access response (RAR), or other RACH transmission message) by the PRACH over physical resource blocks (PRBs) that are interlaced in an unlicensed band in an NR unlicensed (NR-U) communication. The UE 400, for example, can then transmit the random access channel transmission in the PRACH by interlacing the PRBs defining the PRACH in the unlicensed band.

The PRACH can be defined over interlaces PRBs rather than contiguous PRBs. An interlace can be referred to herein as a plurality of non-contiguous resource blocks. The plurality of (non)contiguous resource blocks may be selected in such a manner that the resource blocks span at least 80% of the available bandwidth of the unlicensed spectrum. In unlicensed spectrum, especially in 5 GHz band, there is an occupied channel bandwidth (OCB) regulation in EU. With the OCB regulation, a transmission has to occupy more than 80% of declared nominal channel bandwidth. The interlaced PRBs for PRACH can further be configured or generated to satisfy or meet this OCB regulation.

In unlicensed spectrum, there is PSD limit, which is usually defined per 1 MHz unit bandwidth in a sliding window fashion. Thus, when transmission occurs over contiguous PRBs, the total transmission power is limited by PSD than by the limit on total transmission power. When interlaced PRBs are used, it is possible to allocate the amount of power allowed for unit 1 MHz bandwidth on single PRB, if adjacent PRBs in the same interlace are 1 MHz apart from each other.

In an embodiment, the interlaced PRBs for PRACH can be equally spaced. This is to maximally utilize the transmission power allowed in unit bandwidth. This is also to make the interlace design uniform and more simplified.

Alternatively, or additionally, the PRBs for PRACH can be configured to be irregularly spaced. In an example, the processor(s) 410/510 can allocate 2 interlaces, each having equi-distance between PRBs, and select X number of PRBs randomly from the two interlaces, in which X is a positive integer. The distance between adjacent PRBs in the interlaced PRBs for PRACH can be at least 1 MHz apart from each other. This can serve to maximally utilize the transmission power allowed in unit bandwidth.

In other embodiments, the preamble sequence for PRACH can be mapped over interlaced PRBs in configuring the PRACH transmission (e.g., MSG 1, or the like). For example, only short sequence of L-139 can be supported for the NR unlicensed transmissions or NR-U communications. As such, NR-U transmissions can be narrowed to only these types of L-139 transmissions without L-839. This can be because the short sequence can use the subcarrier spacing (SCS) the same with data channel. Therefore, guardband (GP) is not needed. However, if the RACH preamble is transmitted using a SCS that is different from data channel, guardband could be needed. The use of long sequence is motivated for longer symbol duration and, thus, longer CP duration. In the case of unlicensed spectrum, the need for accommodating longer propagation delay is weakened due to the limited transmission power by regulation, which results in a smaller coverage.

In an aspect of this embodiment, a preamble transmission can be configured over PRACH that has interlaced PRBs using the same SCS as with that of a data channel (e.g., a physical downlink shared channel (PDSCH), physical uplink shared channel (PUSCH), or the like). When interlace(s) of PRBs are used for preamble with SCS that is different from data channel, the provisioning of guardband could be more challenging compared to contiguous PRBs as each PRB will need guardband in it.

In another embodiment, the interlace for PRACH can be generated to comprise at least 12 PRBs for short sequence preamble transmission. This is because 12 PRBs (144 tones) are necessary for L-139 sequence mapping, while 5 tones/ subcarriers may be left unused.

In an aspect, the L-139 sequence can be used with 1.25 KHz subcarrier spacing for PRACH. For example, one PRB with 15 KHz SCS may accommodate 144 tones of 1.25 KHz. One PRB is sufficient for one L-139 sequence mapping, while 5 tones of 1.25 KHz SCS can be used for guard band. The same sequence mapping could be repeated in each PRB of the interlace.

Figure 7:
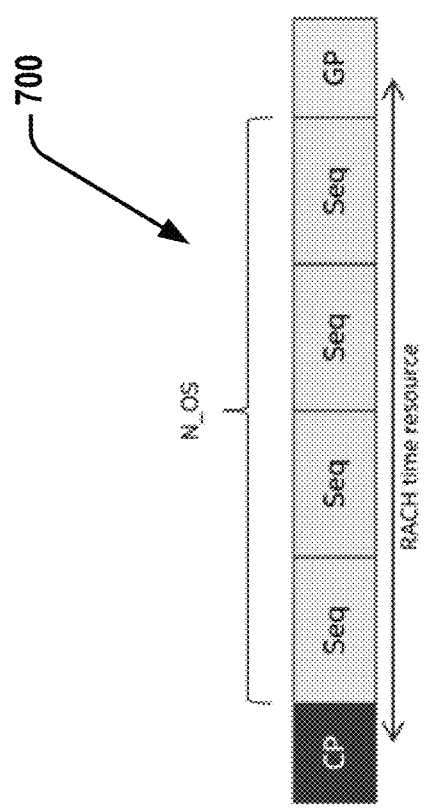
FIG. 7 is a diagram illustrating an example of a random access channel preamble transmission according to various aspects discussed herein.

Referring to FIG. 7, illustrated is an example of a random access channel preamble transmission 700. The transmission 700 across time comprises a cyclic prefix (CP), a number of sequences (N_OS) or repetitions of preamble sequences (Seq), and a guardband (GP) or gap, which can together comprise a PRACH occasion.

Figure 8:
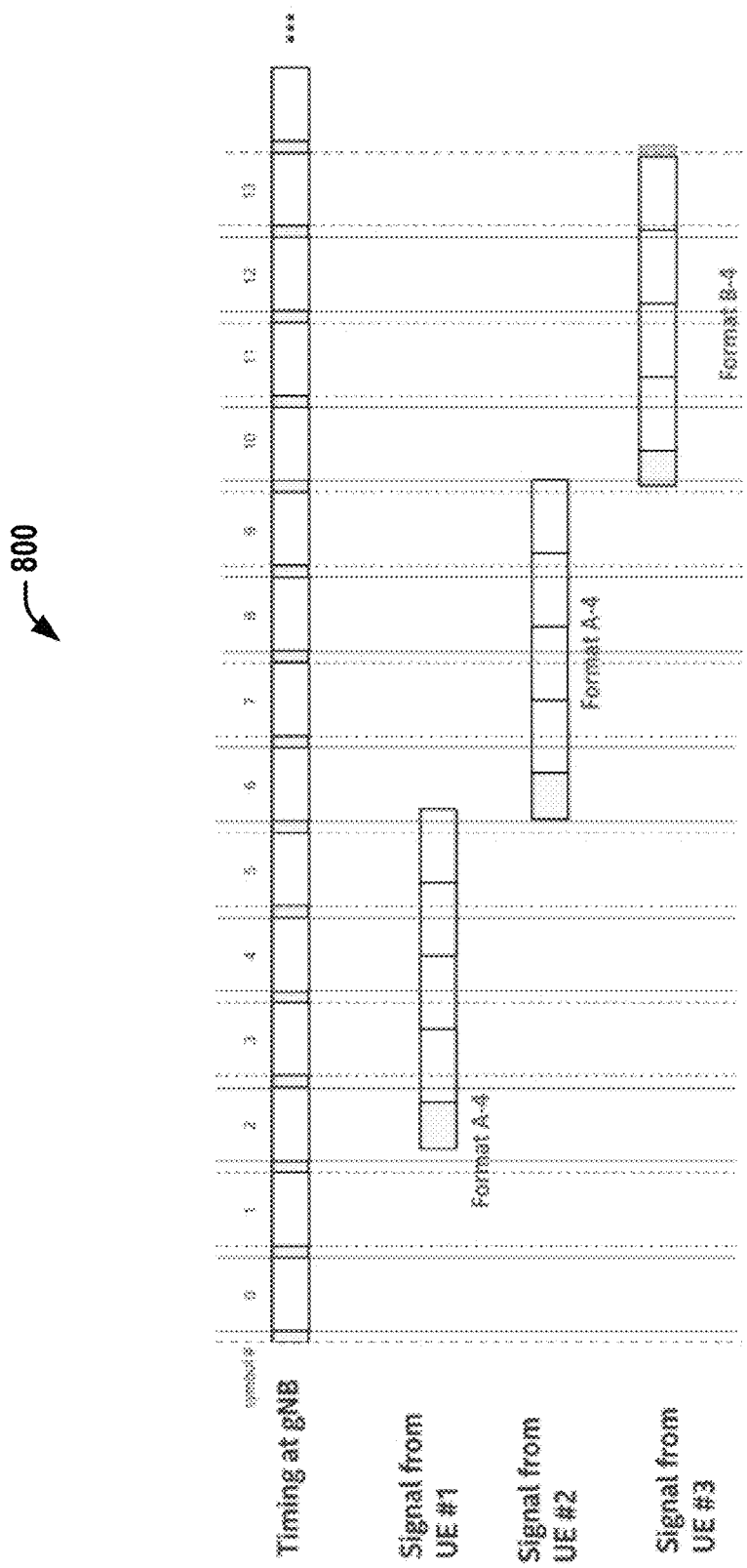
FIG. 8 is a diagram illustrating an example of multiple physical random access channel (PRACH) occasions according to various aspects discussed herein.

Referring to FIG. 8, illustrated is an example of multiple PRACH occasions 800 that can be configured for different UEs. Each of the PRACH occasions can have or comprise four symbols. A slot of each PRACH can include up to fourteen symbols so that up to three different PRACH occasions can be transmitted within each slot from one or more different UEs. Thus, for the case of short sequence L-139, it is possible that multiple PRACH occasions can be configured accordingly.

In an embodiment, a gap can be provided between PRACH occasions. The gap can be predefined or configurable dynamically, such as by higher layer signaling. The gap can be in the unit of symbols, in which such a gap can configure time for LBT between the PRACH occasions.

In another embodiment, additional preamble formats can be defined beyond Release 15 of the 3GPP TS for NR licensed communications (e.g., TS 38.211) so that the gap for NR-U has a longer GP duration than existing ones in Release 15 of 3GPP standards. This can allow utilization of the GP for LBT with a longer GP duration for NR-U communications.

In other embodiments, LBT can be utilized different for LBT for random access procedures. In particular, a single interval LBT can be configured for use for MSG 1 transmission. Alternatively, or additionally, where data has the highest priority, the Cat-4 LBT with highest priority can be used for MSG 1 transmission.

In an aspect, single interval LBT can be used (or configured) for MSG 2 transmission, if not multiplexed with other unicast data. Alternatively, or additionally, a single interval LBT can be used for MSG 2 transmission regardless of whether multiplexed with other unicast data or not.

In an aspect, Cat-4 LBT with highest priority can be used for MSG 2 transmission, if not multiplexed with other unicast data. Alternatively, or additionally, proposed that Cat-4 LBT with highest priority is used for MSG 2 transmission regardless of whether multiplexed with other unicast data or not.

In an aspect, single interval LBT can be used for MSG 3 transmission, if not multiplexed with other unicast data. Alternatively, or additionally, a single interval LBT can be used for MSG 3 transmission regardless of whether multiplexed with other unicast data or not.

In an aspect, Cat-4 LBT with highest priority can be used for MSG 3 transmission, if not multiplexed with other unicast data. Alternatively, or additionally, Cat-4 LBT with highest priority can be used for MSG 3 transmission regardless of whether multiplexed with other unicast data or not.

In an aspect, single interval LBT can be used for MSG 4 transmission, if not multiplexed with other unicast data. Alternatively, or additionally, single interval LBT can be used for MSG 4 transmission regardless of whether multiplexed with other unicast data or not.

In an aspect, Cat-4 LBT with highest priority can be used for MSG 4 transmission, if not multiplexed with other unicast data. Alternatively, or additionally, Cat-4 LBT with highest priority can be used for MSG 4 transmission regardless of whether multiplexed with other unicast data or not.

In other embodiments, MSG 2 transmission for NR-U can be generated by configuring a NR RAR window that is increased to X symbols/slots/ms, in which X is non-negative integer that is greater than the Release 15 3GPP window for NR licensed communication. This can accommodate the possible delay in MSG2 transmission due to LBT. The X values can be configured via system information (e.g., via system information block, or the like) for NR-U.

In one example, the UL grant in MSG 2 to schedule MSG 3 can indicate a validity timer in which the MSG3 transmission is allowed. During the validity timer, a UE 400 can perform LBT and transmit MSG 3, where the scheduling information other than the exact slot index can be sent in MSG 2. After the expiration of validity timer, the UE 400 is not expected to perform MSG 3 transmission and could be required to start from MSG 1 transmission in the PRACH communication process. Alternatively, a UL grant in MSG2 can schedule multiple slots for potential MGS 3 transmission. The UE 400 may transmit in one of the scheduled slots according to the success of LBT.

In another embodiment, NR PREAMBLE_TRANSMISSION_COUNTER (as a preamble transmission counter of the UE 400, gNB 500, or other network component or device) is not increased if MSG 1 could not be transmitted due to LBT failure. This also includes that the UE 400 does not increase its transmission power or increase PREAMBLE_POWER_RAMPING_COUNTER when MSG 1 could not be transmitted due to LBT failure.

Rel-15 NR system supports much wider maximum channel bandwidth (CBW) than LTE's 20 MHz. Wideband communication is also supported in LTE via carrier aggregation (CA) of up to 20 MHz component carriers (CCs). By defining wider CBW in NR (e.g., NR-U), it is possible to dynamically allocate frequency resources via scheduling, which can be more efficient and flexible than the CA operation. Additionally, having single wideband carrier has a merit in terms of low control overhead as it needs only single control signaling, whereas CA requires separate control signaling per each aggregated carrier. Moreover, the spectrum utilization can be improved by eliminating the need of guardband between CCs. The following describes the supported CBW at a given subcarrier spacing.

Referring to FIG. 9, illustrates is an example table 900 that provides the supported CBW at a given subcarrier spacing. Here, a maximum transmission bandwidth configuration NRB can be for frequency range 1 (FR 1) (450 MHz-6000 MHz).

Referring to FIG. 10, illustrates an example table 1000 that provides the supported CBW at a given subcarrier spacing. Here, the maximum transmission bandwidth configuration NRB can be for frequency range (FR 2) (24250 MHz-52600 MHz).

In short, up to 100 MHz CBW can be supported in FR1 and up to 400 MHz CBW is supported in FR2.

In various other embodiments, multiple PRACH resource configuration can be generated in frequency domain (or in frequency and time domain) for a given NR wideband carrier to improve the reliability of preamble transmission subject to LBT. In order to overcome the possible blocking of a BW including the PRACH resource, multiple PRACH resources can be configured in the frequency domain.

In another embodiment, the multiple PRACH resources can be configured in frequency and time domain. In other words, PRACH resources in different frequency ranges can be configured via the UE 400/gNB 500 in different time domain resources (e.g., in different slot or different symbol within a slot), i.e., time-domain offset.

For example, the UE 400 can select the PRACH resource among the frequency ranges for which the LBT has succeeded. If LBT succeeds for multiple PRACH resources, the UE 400 can choose to transmit preamble over one of such PRACH resources. This selection of the resource that has succeeded from among a plurality of resources can be random. Alternatively, or additionally, the selection can be according to the order in the frequency domain, e.g., PRACH in lowest (or highest) frequency among those succeeded LBT. Alternatively, or additionally, the selection can be according to the earliest PRACH occasion, if multiple PRACH resources are configured in frequency and time domains. This can improve the reliability of preamble transmission as well as reduce the latency involved in the preamble transmission, and thus reduce overall initial access latency.

Figure 11:
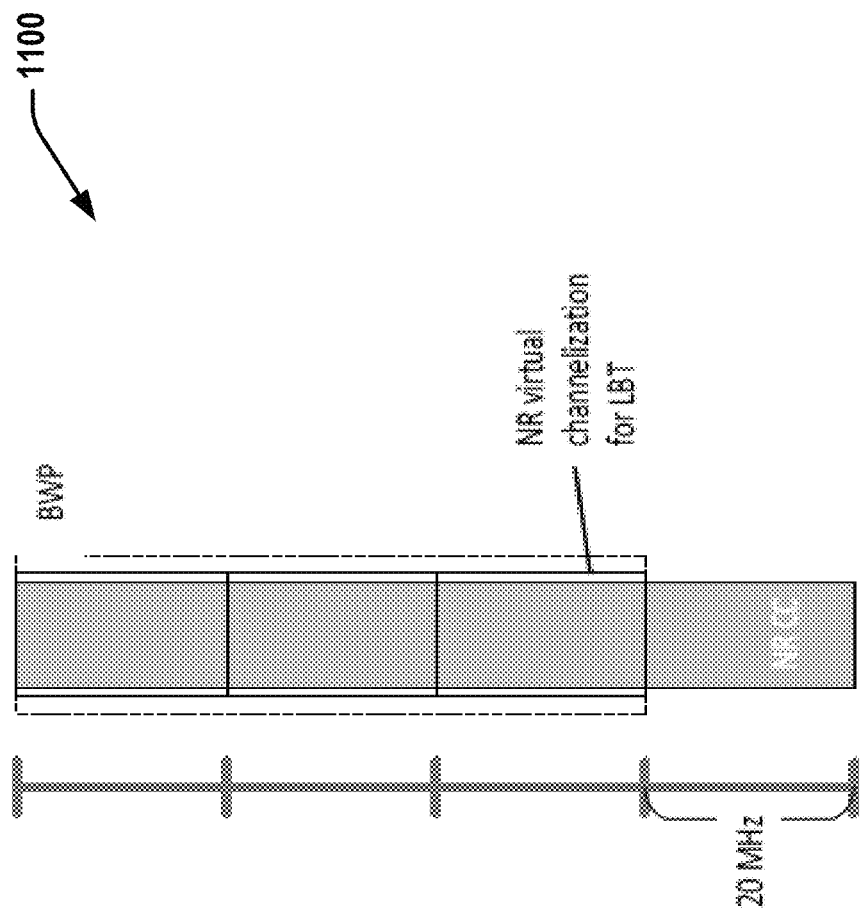
FIG. 11 is a diagram illustrating an example configuration of NR channel/bandwidth part (BWP) for unlicensed band operation.

Referring to FIG. 11, illustrated is an example configuration of NR channel/bandwidth part (BWP) 1000 for unlicensed band operation.

Wideband operation of NR-unlicensed is possible by configuring CBW or the bandwidth of a bandwidth part (BWP) to be an integer multiple of channel raster bandwidth, while aligning the boundary of the channel (or BWP) with the existing channelization.

Figure 12:
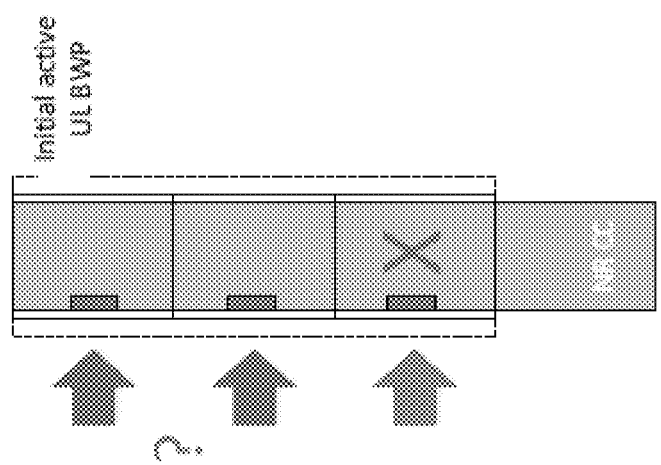
FIG. 12 is a diagram illustrating another example configuration of multiple PRACH resource configuration in frequency domain and in frequency/time domain in a NR wideband carrier for unlicensed band operation.
Figure 12:
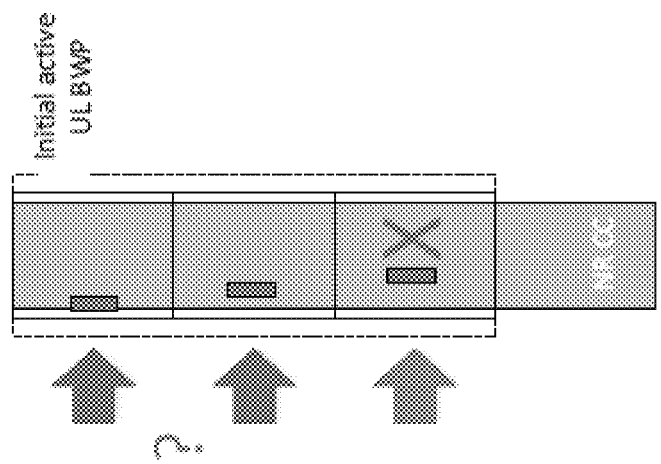

Referring to FIG. 12, illustrated is another example configuration of multiple PRACH resource configuration(s) 1200 in frequency domain (on left) and in frequency/time domain (right) in a NR wideband carrier for unlicensed band operation. If a single PRACH resource is configured in a wideband carrier and if 20 MHz spectrum that includes the configured PRACH resource is occupied by other neighbouring network, the delay in transmitting the preamble will be consequently increased, and thus, the initial access delay as well. In order to overcome the abovementioned issue, it can be considered that multiple PRACH resources can be configured in the frequency domain as illustrated in the figure below. In another embodiment, the multiple PRACH resources can be configured in frequency and time domain. In other words, PRACH resources in different frequency ranges are configured in different time domain resources (e.g., in different slot or different symbol within a slot), i.e., time-domain offset.

A UE 400, for example, can select the PRACH resource among the frequency ranges for which the LBTs have succeeded at each. If LBT succeeds for multiple PRACH resources (each range without an X), the UE 400 can then choose (?) to transmit preamble over one of such PRACH resources. The selection can be random. The selection can be according to the order in the frequency domain, e.g., PRACH in lowest (or highest) frequency among those succeeded LBT. The selection can be according to the earliest PRACH occasion, if multiple PRACH resources are configured in frequency and time domains.

Figure 13:
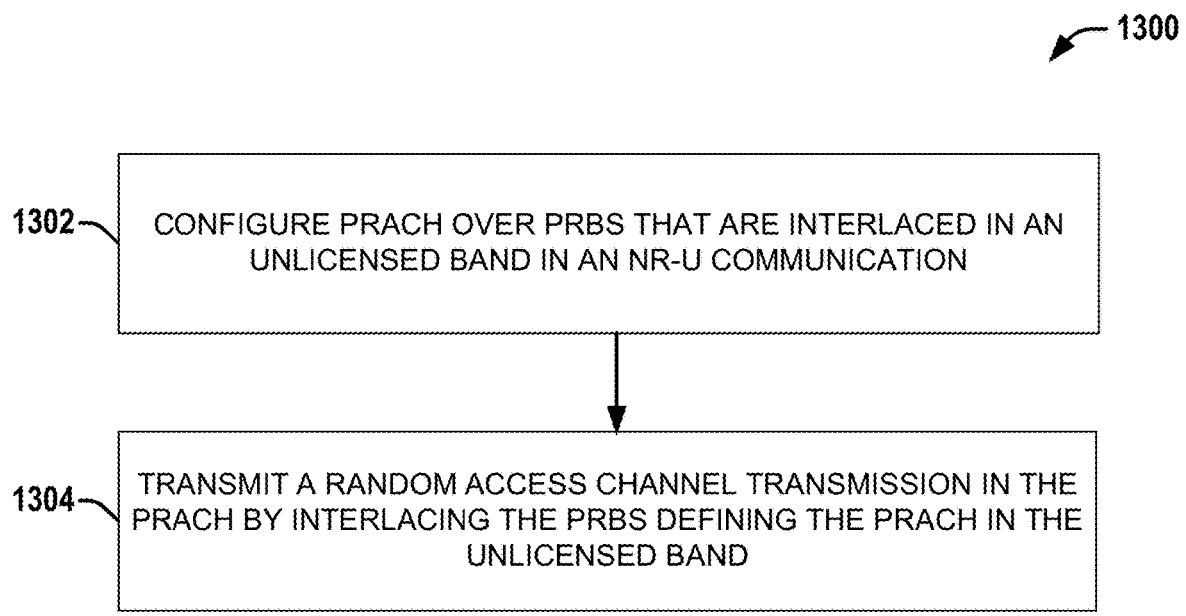
FIG. 13 is a diagram illustrating an example process flow for configuring PRACH over interlaced PRBs according to various aspects discussed herein.

Referring to FIG. 13, illustrated an example process flow 1300 for processing or configuring PRACH over interlaced PRBs.

The process flow 1300 initiates at 1302 with configuring/defining a PRACH over PRBs that are interlaced in an unlicensed band in an NR-U communication.

At 1304, the process flow includes transmitting a random access channel transmission in the PRACH by interlacing the PRBs defining the PRACH in the unlicensed band.

The process flow 1300 can further comprise equally spacing the interlaced PRBs of the PRACH, or irregularly spacing the interlaced PRBs of the PRACH by allocating at least two interlaces comprising an equi-distance between PRBs and selecting randomly a number of PRBs from the at least two interlaces.

In an example, generating the PRACH transmission configuration can include configuring a distance between adjacent PRBs of the interlaced PRBs for the PRACH by at least 1 MHz from one another.

In another example, the process flow can include generating a random access preamble transmission in the PRACH based only on a short sequence of a short sequence length L-139 of subcarriers, and a subcarrier spacing being a same as a data channel. In an aspect, up to three random access channel transmissions in different PRACH occasions can be generated within a slot of the PRACH.

Figure 14:
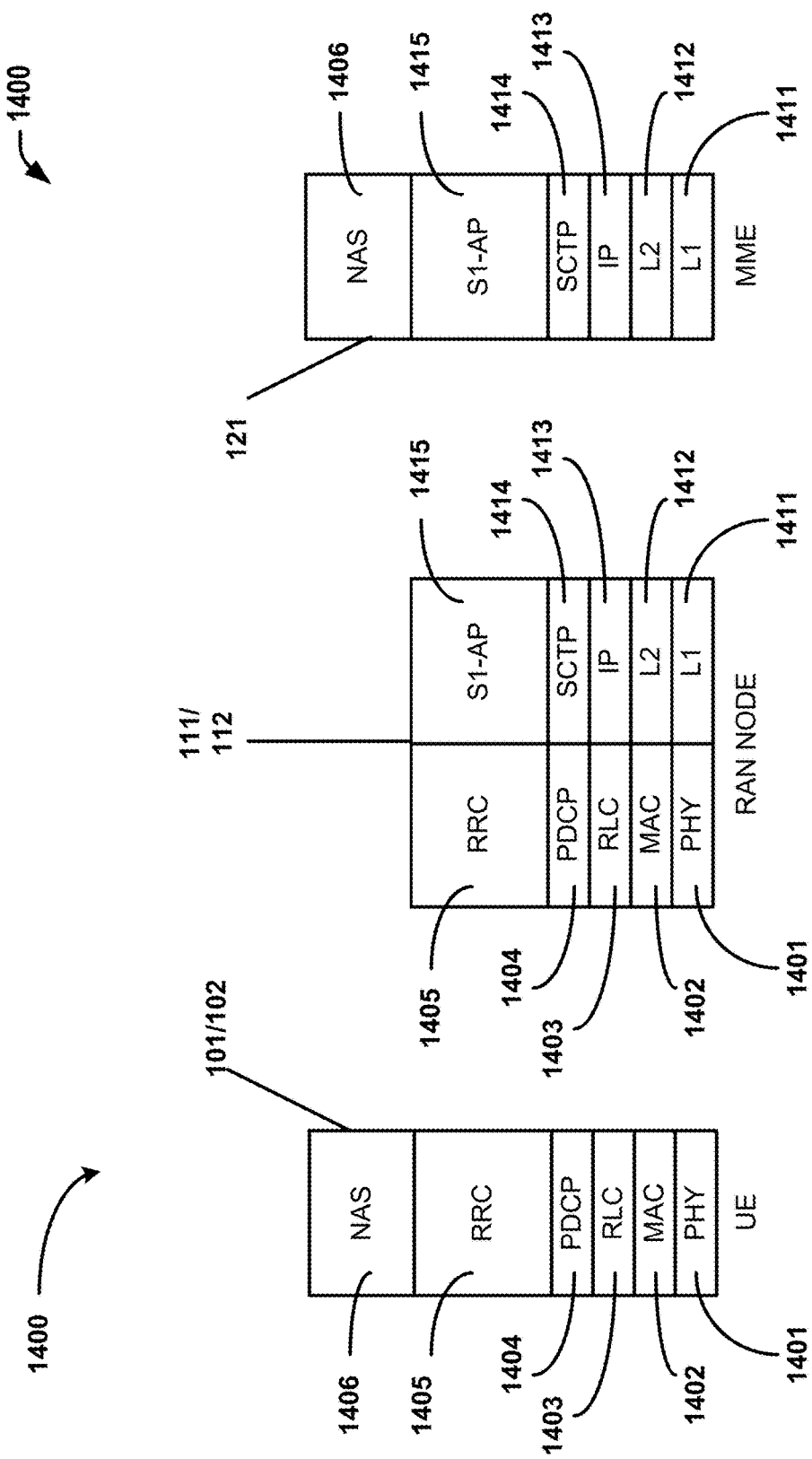
FIG. 14 illustrates a control plane protocol stack that can be implemented for operation of various embodiments and aspects described herein.

FIG. 14 is an illustration of a control plane protocol stack in accordance with various embodiments described herein. In this embodiment, a control plane 1400 is shown as a communications protocol stack between the UE 101 (or alternatively, the UE 102), the RAN node 111 (or alternatively, the RAN node 102), and the MME 121.

The PHY layer 1401 may transmit or receive information used by the MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as the RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

The non-access stratum (NAS) protocols 1406 form the highest stratum of the control plane between the UE 101 and the MME 121. The NAS protocols 1406 support the mobility of the UE 101 and the session management procedures to establish and maintain IP connectivity between the UE 101 and the P-GW 123.

The S1 Application Protocol (S1-AP) layer 1415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 may ensure reliable delivery of signaling messages between the RAN node 111 and the MME 121 based, in part, on the IP protocol, supported by the IP layer 1413. The L2 layer 1412 and the L1 layer 1411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1411, the L2 layer 1412, the IP layer 1413, the SCTP layer 1414, and the S1-AP layer 1415.

Figure 15:
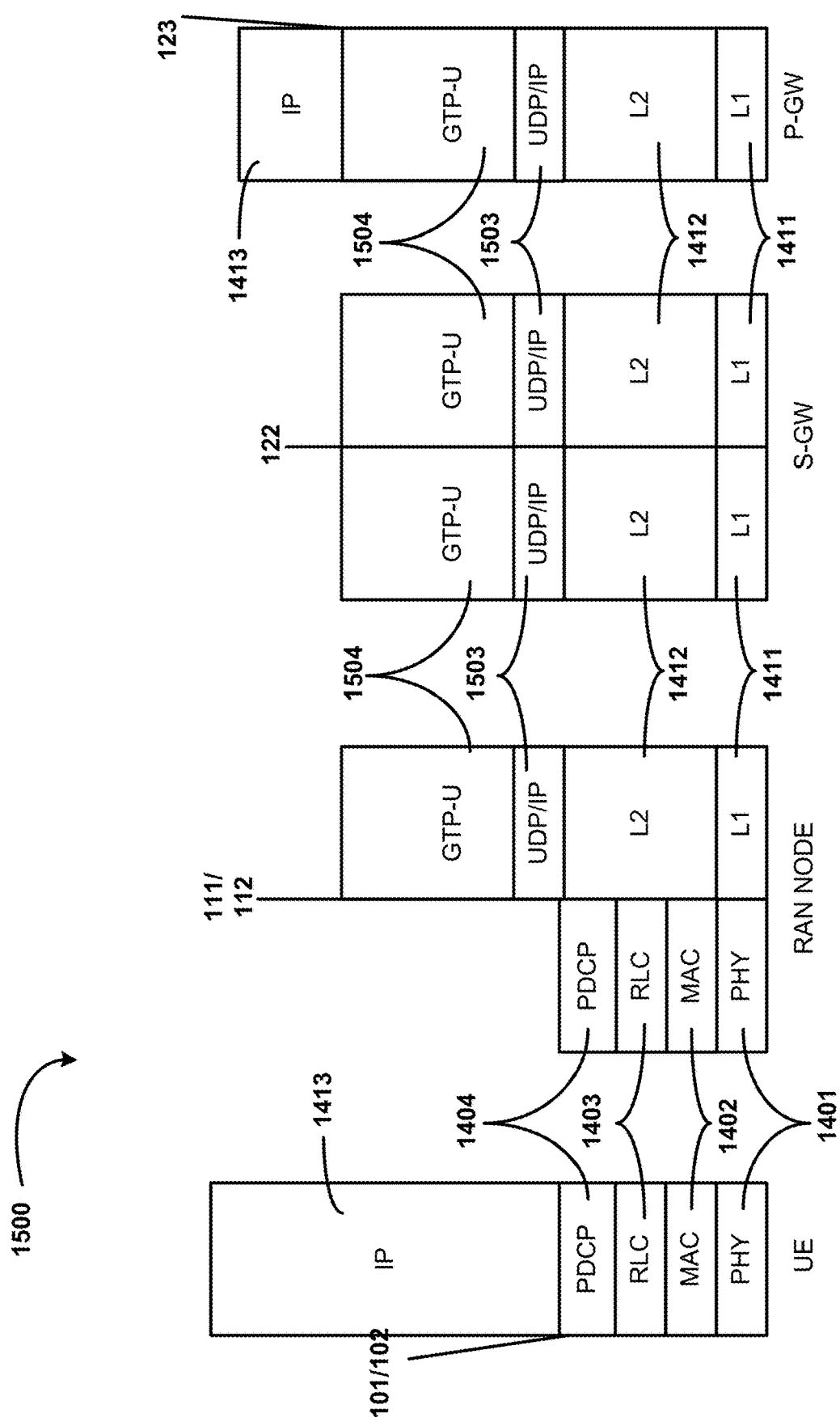
FIG. 15 illustrates user plane protocol stack that can be implemented for operation of various embodiments and aspects described herein.

FIG. 15 is an illustration of a user plane protocol stack in accordance with one or more embodiments herein. In this embodiment, a user plane 1500 is shown as a communications protocol stack between the UE 101 (or alternatively, the UE 102), the RAN node 111 (or alternatively, the RAN node 112), the S-GW 122, and the P-GW 123. The user plane 1400 may utilize at least some of the same protocol layers as the control plane 1400. For example, the UE 101 and the RAN node 111 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1411, the L2 layer 1412, the UDP/IP layer 1503, and the GTP-U layer 1504. The S-GW 122 and the P-GW 123 may utilize an S5/S8a interface to exchange user plane data via a protocol stack comprising the L1 layer 1411, the L2 layer 1412, the UDP/IP layer 1503, and the GTP-U layer 1504. As discussed above with respect to FIG. 10, NAS protocols support the mobility of the UE 101 and the session management procedures to establish and maintain IP connectivity between the UE 101 and the P-GW 123.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Example 1 can define PRACH over interlaced PRBs rather than contiguous PRBs.

Example 2 can include that the interlaced PRBs for PRACH are equally spaced.

Example 3 can include that the PRBs for PRACH are irregularly spaced.

Example 3.1 can include to allocate two interlaces, each having an equal distance between PRBs, and to randomly select X number of PRBs from the two interlaces.

Example 4 can include that the distance between adjacent PRBs in the interlaced PRBs for PRACH are at least 1 MHz apart from each other.

Example 5 can include that only short sequence of L-139 is supported for NR unlicensed.

Example 6 can include that preamble transmission over PRACH that has interlaced PRBs uses the same SCS with that of data channel.

Example 7 can include that interlace for PRACH consists of at least 12 PRBs for short sequence preamble transmission.

Example 8 can include that a gap can be provided between PRACH occasions.

Example 8.1 can include that the gap is predefined or configurable.

Example 8.2 can include the gap being in the unit of symbols.

Example 9 can include that additional preamble formats are defined, which have longer GP duration than existing ones.

Example 10 can include that single interval LBT is used for MSG 1 transmission.

Example 11 can include that Cat-4 LBT with highest priority is used for MSG 1 transmission.

Example 12 can include that single interval LBT is used for MSG 2 transmission, if not multiplexed with other unicast data, or alternatively, single interval LBT can be used for MSG 2 transmission regardless of whether multiplexed with other unicast data or not.

Example 13 can include that Cat-4 LBT with highest priority is used for MSG 2 transmission, if not multiplexed with other unicast data, or alternatively, Cat-4 LBT with highest priority can be used for MSG 2 transmission regardless of whether multiplexed with other unicast data or not.

Example 14 can include that single interval LBT is used for MSG 3 transmission, if not multiplexed with other unicast data, or alternatively, single interval LBT can be used for MSG 3 transmission regardless of whether multiplexed with other unicast data or not.

Example 15 can include that Cat-4 LBT with highest priority is used for MSG 3 transmission, if not multiplexed with other unicast data, or alternatively, Cat-4 LBT with highest priority can be used for MSG 3 transmission regardless of whether multiplexed with other unicast data or not.

Example 16 can include that single interval LBT is used for MSG 4 transmission, if not multiplexed with other unicast data, or alternatively, single interval LBT can be used for MSG 4 transmission regardless of whether multiplexed with other unicast data or not.

Example 17 can include that Cat-4 LBT with highest priority is used for MSG 4 transmission, if not multiplexed with other unicast data, or alternatively, Cat-4 LBT with highest priority can be used for MSG 4 transmission regardless of whether multiplexed with other unicast data or not.

Example 18 can include that NR RAR window is increased to X symbols or slots or ms, where X is a non-negative integer.

Example 19 can include that UL grant in MSG2 to schedule MSG3 can indicate the validity timer in which the MSG3 transmission is allowed. During the validity timer, a UE can perform LBT and transmit MSG3, where the scheduling information other than the exact slot index can be send in MSG 2. After the expiration of validity timer, the UE is not expected to perform MSG3 transmission and required to start from MSG1 transmission.

Example 20 can include UL grant in MSG2 can schedule multiple slots for potential MGS 3 transmission. A UE can transmit in one of the scheduled slots according to the success of LBT.

Example 21 can include that NR preamble transmission counter is not increased if MSG1 could not be transmitted due to LBT failure, and that UE does not increase its transmission power when MSG1 could not be transmitted due to LBT failure.

Example 21 can include in order to overcome the possible blocking of a BW including the PRACH resource, multiple PRACH resources are configured in the frequency domain by: a) the multiple PRACH resources can be configured in frequency and time domain; as such, the PRACH resources in different frequency ranges are configured in different time domain resources (e.g., in different slot or different symbol within a slot), i.e., time-domain offset.

Example 22 can include where the UE selects the PRACH resource among the frequency ranges for which the LB T have succeeded based on: b) if LBT succeeds for multiple PRACH resources, the UE can choose to transmit preamble over one of such PRACH resources; c) the selection can be random, or d) the selection can be according to the order in the frequency domain, e.g., PRACH in lowest (or highest) frequency among those succeeded LBT; e) the selection can be according to the earliest PRACH occasion, if multiple PRACH resources are configured in frequency and time domains.

Example 23 can include a method comprising: performing a LBT procedure in each of a plurality of PRACH resources configured in the frequency domain; selecting a first PRACH resource on which an LBT procedure is successful; and transmitting a preamble over the first PRACH resource.

Example 24 can include the method of example 23 or some other example herein, further comprising determining LBT procedures are successful on at least two PRACH resources, selecting the first PRACH resource from the at least two PRACH resource randomly; based on an order in a frequency domain of the at least two PRACH resources; or based on an order in a time domain of the at least two PRACH resources.

Example 25 is an apparatus configured to be employed in a User Equipment (UE) for new radio (NR) communications comprising: one or more processors configured to: configure physical resource blocks (PRBs) in a physical random access channel (PRACH) based on an occupied channel bandwidth (OCB) of an unlicensed band in an NR unlicensed (NR-U) communication; and generate a random access channel transmission in the PRACH by interlacing the PRBs defining the PRACH; a radio frequency (RF) interface, configured to provide, to RF circuitry, data for processing the PRACH in the NR-U communication based on the interlaced PRBs.

Example 26 includes the subject matter of Example 25, wherein the one or more processors are further configured to: allocate an amount of power for a unit bandwidth on a single PRB, wherein adjacent PRBs to the single PRB in a same interlace are separated by the unit bandwidth.

Example 27 includes the subject matter of Examples 25-26, wherein the one or more processors are further configured to generate the PRACH based on a regulation of the OCB, wherein the regulation of the OCB comprises the random access channel transmission occupying more than eighty percent of a nominal channel bandwidth that is defined for the PRACH.

Example 28 includes the subject matter of Examples 25-27, wherein the one or more processors are further configured to: equally space the interlaced PRBs of the PRACH, or irregularly space the interlaced PRBs of the PRACH by allocating at least two interlaces comprising an equi-distance between PRBs and selecting randomly a number of PRBs from the at least two interlaces.

Example 29 includes the subject matter of Examples 25-28, wherein the one or more processors are further configured to: generate a random access preamble transmission in the PRACH based only on a short sequence of a short sequence length L-139 of subcarriers, and a subcarrier spacing being a same as a data channel.

Example 30 includes the subject matter of Examples 25-29, wherein the one or more processors are further configured to: generate a random access preamble transmission comprising an interlace for the PRACH that comprises twelve PRBs as a short sequence preamble transmission.

Example 31 includes the subject matter of Examples 25-30, wherein the one or more processors are further configured to: generate up to three random access channel transmissions in different PRACH occasions within a slot of the PRACH.

Example 32 includes the subject matter of Examples 25-31, wherein the one or more processors are further configured to: generate a gap between the different PRACH occasions based on one or more preamble formats wherein the gap comprising a longer gap than a defined gap of NR licensed band specified in Release 15 of 3GPP Technical Standards.

Example 33 includes the subject matter of Examples 25-32, wherein the one or more processors are further configured to: perform a single interval LBT procedure or a Cat-4 LBT procedure to transmit or receive the PRACH comprising at least one of: an MSG 1, a message 2 (MSG 2), a message 3 (MSG 3), or a message 4 (MSG 4).

Example 34 includes the subject matter of Examples 25-33, wherein the one or more processors are further configured to: perform the single interval LBT procedure or the Cat-4 LBT procedure to transmit or receive at least one of the MSG 2, the MSG 3, or the MSG 4, in response to the at least one of: the MSG 2, the MSG 3, or the MSG 4 not being multiplexed with other unicast data.

Example 35 includes the subject matter of Examples 25-34, wherein the one or more processors are further configured to: process an indication of a validity timer from a UL grant in a MSG 2 to schedule an MSG 3 transmission with a LBT procedure; in response to an expiration of the validity timer, generate a MSG 1 transmission; and within the validity timer, schedule the MSG 3 in one or more scheduled slots based on the UL grant.

Example 36 includes the subject matter of Examples 25-35, wherein the one or more processors are further configured to not increase at least one of: an NR preamble_transmission_counter (preamble transmission counter), or a preamble_power_ramping_counter (preamble power ramping counter), in response to an LBT procedure failing for an MSG 1 transmission.

Example 37 includes the subject matter of Examples 25-36, wherein the one or more processors are further configured to: process a plurality of PRACH resources in a frequency and a time domain based on corresponding LBT procedures; and based on one or more successes of the LBT procedures, selecting a PRACH resource, and in response to a plurality of successes of the LBT procedure occurring, randomly selecting or selecting with a priority based on an order in frequency/time of the PRACH resource for transmission of the PRACH.

Example 38 is a computer readable storage device storing executable instructions that, in response to execution, cause one or more processors of a user equipment (UE) to perform operations, the operations comprising: configuring a physical random access channel (PRACH) over physical resource blocks (PRBs) that are interlaced in an unlicensed band in an NR unlicensed (NR-U) communication; and transmit a random access channel transmission in the PRACH by interlacing the PRBs defining the PRACH in the unlicensed band.

Example 39 includes the subject matter of Example 38, wherein the operations further comprise: equally spacing the interlaced PRBs of the PRACH, or irregularly spacing the interlaced PRBs of the PRACH by allocating at least two interlaces comprising an equi-distance between PRBs and selecting randomly a number of PRBs from the at least two interlaces.

Example 40 includes the subject matter of Example 38-39, wherein the operations further comprise: configuring a distance between adjacent PRBs of the interlaced PRBs for the PRACH by at least 1 MHz from one another.

Example 41 includes the subject matter of Example 38-40, wherein the operations further comprise: generating a random access preamble transmission in the PRACH based only on a short sequence of a short sequence length L-139 of subcarriers, and a subcarrier spacing being a same as a data channel.

Example 42 includes the subject matter of Example 38-41, wherein the operations further comprise: generating up to three random access channel transmissions in different PRACH occasions within a slot of the PRACH.

Example 43 is an apparatus configured to be employed in a next generation NodeB (gNB) for new radio (NR) communications comprising: one or more processors configured to: configure physical resource blocks (PRBs) in a physical random access channel (PRACH) based on an occupied channel bandwidth (OCB) of an unlicensed band in an NR unlicensed (NR-U) communication; and generate a random access channel transmission in the PRACH by interlacing the PRBs defining the PRACH; a radio frequency (RF) interface, configured to provide, to RF circuitry, data for processing the PRACH in the NR-U communication based on the interlaced PRBs.

Example 44 includes the subject matter of Example 43, wherein the one or more processors are further configured to: generate a gap between different PRACH occasions based on one or more preamble formats wherein the gap comprises a longer gap than a defined gap of NR licensed band specified in Release 15 of 3GPP Technical Standards.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.14 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor for new radio (NR) communications comprising:
    a memory; and
    one or more processors configured to:
        configure physical resource blocks (PRBs) in a physical random access channel (PRACH) based on an occupied channel bandwidth (OCB) of an unlicensed band in an NR unlicensed (NR-U) communication;
        generate a random access preamble transmission in the PRACH, based on a short sequence of a short sequence length L-139 of subcarriers and a subcarrier spacing being a same as a data channel, by interlacing the PRBs defining the PRACH in the unlicensed band.

2. The baseband processor of claim 1, wherein the one or more processors are further configured to:
    allocate an amount of power for a unit bandwidth on a single PRB, wherein adjacent PRBs to the single PRB in a same interlace are separated by the unit bandwidth.

3. The baseband processor of claim 1, wherein the one or more processors are further configured to generate the PRACH based on a regulation of the OCB, wherein the regulation of the OCB comprises the physical random access channel transmission occupying more than eighty percent of a nominal channel bandwidth that is defined for the PRACH.

4. The baseband processor of claim 1, wherein the one or more processors are further configured to:
    equally space the interlaced PRBs of the PRACH, or irregularly space the interlaced PRBs of the PRACH by allocating at least two interlaces comprising an equidistance between PRBs and selecting randomly a number of PRBs from the at least two interlaces.

5. The baseband processor of claim 1, wherein the one or more processors are further configured to:
    generate a random access preamble transmission comprising an interlace of the PRACH that comprises twelve PRBs as a short sequence preamble transmission.

6. The baseband processor of claim 1, wherein the one or more processors are further configured to:
    generate up to three random access channel transmissions in different PRACH occasions within a slot of the PRACH.

7. The baseband processor of claim 6, wherein the one or more processors are further configured to:
    generate a gap between the different PRACH occasions based on one or more preamble formats wherein the gap comprising a longer gap than a defined gap of NR licensed band specified in Release 15 of 3GPP Technical Standards.

8. The baseband processor of claim 1, wherein the one or more processors are further configured to:
    perform a single interval listen-before-talk (LBT) procedure or a Cat-4 LBT procedure to transmit or receive the PRACH comprising at least one of: an MSG 1, a message 2 (MSG 2), a message 3 (MSG 3), or a message 4 (MSG 4).

9. The baseband processor of claim 8, wherein the one or more processors are further configured to:
    perform the single interval LBT procedure or the Cat-4 LBT procedure to transmit or receive at least one of the MSG 2, the MSG 3, or the MSG 4, in response to the at least one of: the MSG 2, the MSG 3, or the MSG 4 not being multiplexed with other unicast data.

10. The baseband processor of claim 1, wherein the one or more processors are further configured to:
    process an indication of a validity timer from a UL grant in a MSG 2 to schedule an MSG 3 transmission with a LBT procedure;
    in response to an expiration of the validity timer, generate a MSG 1 transmission; and
    within the validity timer, schedule the MSG 3 in one or more scheduled slots based on the UL grant.

11. The baseband processor of claim 1, wherein the one or more processors are further configured to not increase at least one of: an NR preamble_transmission_counter, or a preamble_power_ramping_counter, in response to an LBT procedure failing for an MSG 1 transmission.

12. The baseband processor of claim 1, wherein the one or more processors are further configured to:

process a plurality of PRACH resources in a frequency and a time domain based on corresponding LBT procedures; and based on one or more successes of the corresponding LBT procedures, select a PRACH resource, and in response to a plurality of successes of the LBT procedure occurring, randomly select or select with a priority the PRACH resource based on an order in frequency/time of the PRACH resource for transmission of the PRACH.

13. A method of a user equipment (UE) to perform operations via one or more processors, comprising:

configuring a physical random access channel (PRACH) over physical resource blocks (PRBs) that are interlaced in an unlicensed band in an NR unlicensed (NR-U) communication; and transmitting a random access preamble transmission in the PRACH, based on a short sequence of a short sequence length L-139 of subcarriers and a subcarrier spacing being a same as a data channel, by interlacing the PRBs defining the PRACH in the unlicensed band.

14. The method of claim 13, further comprising:

equally spacing the interlaced PRBs of the PRACH, or irregularly spacing the interlaced PRBs of the PRACH by allocating at least two interlaces comprising an equi-distance between PRBs and selecting randomly a number of PRBs from the at least two interlaces.

15. The method of claim 13, further comprising:

configuring a distance between adjacent PRBs of the interlaced PRBs for the PRACH by at least 1 MHz from one another.

16. The method of claim 13, further comprising:

generating up to three random access channel transmissions in different PRACH occasions within a slot of the PRACH.

17. A User Equipment (UE) for new radio (NR) communications comprising:

a memory; and processing circuitry configured to:

configure physical resource blocks (PRBs) in a physical random access channel (PRACH) based on an occupied channel bandwidth (OCB) of an unlicensed band in an NR unlicensed (NR-U) communication; and generate a random access channel transmission in the PRACH, based on a short sequence of a short sequence length L-139 of subcarriers and a subcarrier spacing being a same as a data channel, by interlacing the PRBs defining the PRACH in the unlicensed band.

18. The UE of claim 17, wherein the processing circuitry is further configured to:

generate a gap between different PRACH occasions based on one or more preamble formats wherein the gap comprises a longer gap than a defined gap of NR licensed band specified in Release 15 of 3GPP Technical Standards.

19. The UE of claim 17, wherein the processing circuitry is further configured to:

allocate an amount of power for a unit bandwidth on a single PRB, wherein adjacent PRBs to the single PRB in a same interlace are separated by the unit bandwidth.

20. The UE of claim 17, wherein the processing circuitry is further configured to:

configure a random access preamble in a set of PRBs of the PRACH for the random access channel transmission.

* * * * *